Figure 1:
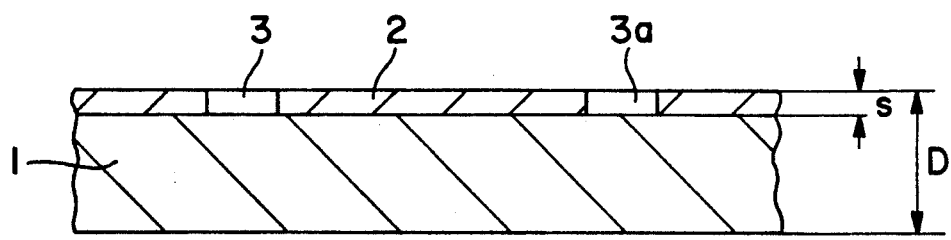

United States Patent [19]

Hoffmann et al.

[11] Patent Number: 5,202,545
[45] Date of Patent: Apr. 13, 1993

[54] PROCESS FOR POINT-WELDING A HIGHLY CORROSION RESISTANT METAL COVER PLATE ON A METAL SUPPORT

[75] Inventors: Theodor Hoffmann; Karl-Heinz Leinweber, both of Altena; Armando Manfrohn, Haiger, all of Fed. Rep. of Germany

[73] Assignee: VDM Nickel-Technologie AG, Werdohl, Fed. Rep. of Germany

[21] Appl. No.: 734,930

[22] Filed: Jul. 24, 1991

[30] Foreign Application Priority Data

Jul. 27, 1990 [DE] Fed. Rep. of Germany ....... 4023814

[51] Int. Cl.[5] .............................................. B23K 9/007
[52] U.S. Cl. .................................. 219/127; 219/137 R
[58] Field of Search ............................ 219/127, 137 R

[56] References Cited

U.S. PATENT DOCUMENTS

2,158,799 5/1939 Larson.
4,163,869 8/1979 Almand, III et al. ............... 219/127
4,359,599 11/1982 Benner ................................ 219/127

FOREIGN PATENT DOCUMENTS

1113726 4/1956 France.
57-94473 6/1982 Japan .................................. 219/127
61-115672 6/1986 Japan.

OTHER PUBLICATIONS

Woods, "Serial Plug Welding" Networking Prod., May 1965, No. 21.
W. D. H. Plant et al., "In a World Concerned for the Environment Nickel . . . Desuphurization Structures", Nickel, vol. 3, Mar. 1989, pp. 6-7.

*Primary Examiner*—Clifford C. Shaw
*Attorney, Agent, or Firm*—Marmorek, Guttman & Rubenstein

[57] ABSTRACT

The instant invention relates to the point welding of a highly corrosion-resistant metal cover plate to a less corrosion-resistant support and provides for the highly corrosion-resistant cover plate to be provided with holes and to be bonded at the same time to the support by a first build-up weld in the holes. The first weld layer is then covered by a second build-up weld. build-up welding is effect by means of metal-inert gas welding with wire electrode.

5 Claims, 2 Drawing Sheets

FIG. 5
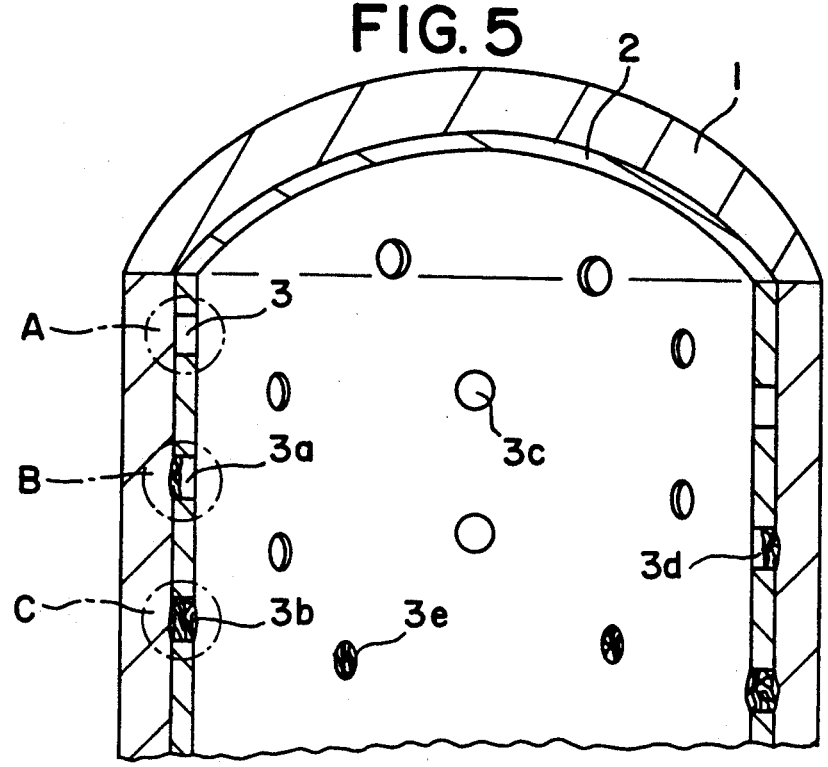
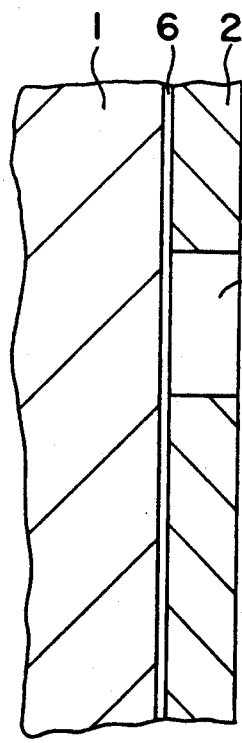
FIG. 6
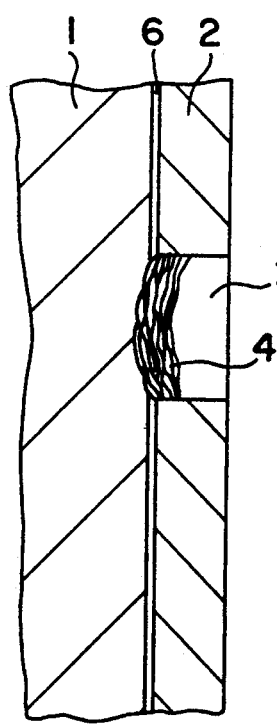
FIG. 7
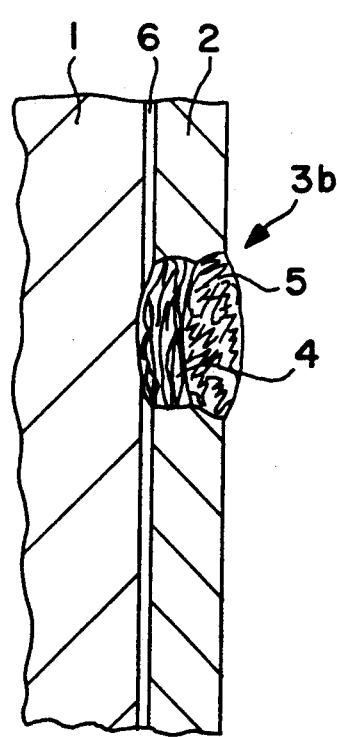
FIG. 8

PROCESS FOR POINT-WELDING A HIGHLY CORROSION RESISTANT METAL COVER PLATE ON A METAL SUPPORT

The instant invention relates to a process for point-welding a highly corrosion-resistant metal cover plate of minimal thickness on the surface of a less corrosion-resistant metal support of greater wall thickness, whereby the metal cover plate is provided with several holes distributed over its surface, is then laid on top of the support and is welded in the holes to said support under inert gas with the addition of a highly corrosion-resistant welding additive, whereby the surface area of the support which is uncovered within the hole is provided with a build-up weld so that the metal cover plate is welded to the support at the edge of the hole.

Such a process is known from U.S. Pat. No. 3,213,261 in which the welding of a relatively thick metal cover plate to a support is described. The invention on the other hand concerns rather the attachment of so-called shroud linings in containers or equipment elements in the fields of chemical industry, environmental technology, offshore and marine technology, seawater desalinization plants and other similar areas of applications.

In past years the demands for corrosion resistance of equipment, especially in the chemical industry and environmental technology have increased considerably. As a result there has been an increased utilization of highly corrosion-resistant materials, especially those based on nickel such as for instance nickel-chrome-molybdenum alloys. Known examples of this group are Nicro-fer 5716 hMoW (German Material No. 2.4819) and Nicrofer 6616 hMo (German Material No. 2.4610). Nicrofer 5923 hMO (German Material No. 2.4605) is a new development. These highly corrosion-resistant materials are expensive because of their contents in nickel, chrome and molybdenum so that it becomes very interesting from an economical point of view to use them sparingly. Such a sparing utilization is for instance possible when it is applied in form of thin-wall plating on carbon steel. Such plating requires solid bonding to the carbon steel support material which is achieved as a rule by means of explosion plating or roller plating, but also by build-up welding in special cases.

Lately the earlier-mentioned shroud lining, also called "wallpapering" in English, has received increasing interest. In this process thin-walled linings of a sheet metal plate or a covering typically 1.5 to 2.5 mm thick is applied to the areas at risk from corrosion. This has special advantages, for instance when lining or covering is needed after manufacture, e.g. in case of repair or improvements brought to large-volume components such as those which are required for flue-gas desulfurization in fossil-fueled power plants.

Shroud linings are traditionally attached by welding the metal covers or bands to the inner wall of the equipment. The plates or bands are attached to the support material at their edges by means of flashing seams. Subsequently the flashing seams and the intervals required for the production of the flashing seams must be covered with strips made of the corrosion-resistant material. These covering strips must in turn be intimately bonded to the covering material by flashing-seam welding. Inversely, ridges of corrosion-resistant material instead of the covering strips can be applied to the support material at first and the plates or bands of corrosion-resistant materials are then attached on these ridges by flashing-seam welding.

A similar variant of the above-mentioned method of attachment is achieved if holes are made into the sheet metal plates or bands made of the corrosion-resistant covering material, whereby the inner edges of said holes are bonded to the support material by flashing-seam welding. In this case it is necessary to cover the holes with covers made of the corrosion-resistant material.

The attachment methods according to the described, older state of the art, are very expensive. They are always required to attach the plates or bands to be applied to the support. However their cost can be reduced considerably if the plates or bands to be applied are selected in very large formats. However point-welding in the surface in accordance with the state of the art is then required at an increased number of points as experience shows that 3 to 5 such point welds must be provided per square meter.

In practice there exists a process for the attachment of such large-formate covering plates in which holes are burned into the plates or bands made of the corrosion-resistant material, the inside edges of said holes being bonded to the support material by means of flashing-seam welding. In this case it is necessary to cover the holes with covers made of the corrosion-resistant material which completely covers the hole area, and this again requires flashing-seam welding. But even this is still very expensive because of the requirement that the individual welds be covered with pieces of covering plate.

It has been tried to point-weld through the highly corrosion-resistant covering plates and bands without first perforating them by using the metal-inert ga process (MIG). With such blind welding through the material it is however impossible to judge how deep the welding has actually penetrated through the covering and into the support material below in order to ensure sufficient. When welding through the material the cover must lie on the support material without any clearance, and this can generally not be guaranteed in practice on site. If on the other hand the support material has been melted and bonding is nevertheless achieved, the iron admixture in the welding deposit which comes from the support material cannot be controlled. In such cases there is therefore always a risk that the welding deposit may fail to meet requirements in its chemical analysis and contains much more iron than the admissible maximum under material standards for corrosion-resistant covering materials. Its resistance to corrosion is thus no longer assured.

The problem therefore consists in finding a process for point-welding cover plates that produces a secure bond with the support and the desired corrosion resistance at low cost and justifiable technical effort.

The proposal according to the instant invention is therefore to effect the build-up weld in two phases whereby a first build-up weld which is thinner than the thickness of the cover plate and completely covers the surface of the support lying open in the hole is produced and the cover plate is welded to the support whereupon, following the hardening of the first build-up weld layer, the build-up weld is covered with a second build-up weld and the inert gas atmosphere of the first applied weld is maintained uninterruptedly through the hardening phase of the first weld layer until the end of the second build-up weld.

It has been shown that by welding in two build-up welds separated in time from each other, covering which had been taken into consideration before testing the invention can be omitted altogether and that the invention produces a less expensive process which is more reliable in operation.

In the first build-up weld a weld layer is placed on the material of the support and in this process is firmly bonded to the latter. At the same time the bond between cover plate and support is created. This first build-up weld as a rule contains a high degree of admixture of iron which has its origin in the support. Surprisingly the admixture of iron barely continues in the second build-up weld and can be kept so low for the second weld layer through selection of appropriate welding parameters that the second weld layer which is subjected to corrosion attack remains still within the standards of the welding deposit with respect to its admixture of iron. In critical cases it is however also possible to use more or less clearly over-alloyed electrode wires in order to block an excess of iron in the second weld layer completely. It is important but understandable for the person schooled in the art that the second build-up weld should cover the first build-up weld but should not extend unduly beyond the diameter of the hole to be sure to avoid a possible separation from occurring between the surface of the cover plate adjoining the hole and the welding deposit.

It has been shown that the process according to the invention can be applied in all welding positions, even when the cover plate does not lie on the support without any clearance, i.e. under practical site, conditions.

An embodiment of the invention provides for the first and the second build-up weld to be produced under the metal-inert gas (MIG) welding process with wire electrode, whereby the first layer is welded with spray-arc welding and the second layer with pulsed-arc welding.

A preferred embodiment of the invention provides for the second build-up weld which follows the first build-up weld after a brief interval to be placed on the still war first weld layer.

The two build-up welds are thus preferably carried out so close together, i.e. practically in one work phase, that the first build-up weld has just enough time to cool down sufficiently. A time interval of 3 to 6 seconds between the first build-up weld and the second build-up weld is often sufficient for this.

The process can be carried out with great operational reliability and uniform quality by using modern techniques, in that upon manual initiation of the first build-up welding a pre-programmed computer program takes over the control of the electrical welding parameters and their duration and initiates the second build-up weld after a predetermined time interval.

The computer program can take into account an average site-typical clearance between the support and the cover plate, and thus ensure a minimum filling of the hole. This is done regularly by providing a banking build-up which is approximately compensated by the maximum clearance occurring between the cover plate and the support.

It should be mentioned here that manual start of a given inert-gas welding procedure has long been known from DE PS 825730. A time clock which switches on the welding current after build-up of the inert-gas atmosphere is actuated according to that patent.

A further embodiment provides for the computer program to terminate the second build-up weld through diminishing current intensity over a brief after-running period. A detrimental central welding crater in the second weld layer can thus be avoided with certainty.

Since the first build-up weld receives iron from the support, as mentioned earlier, the process can be carried out for example as described by Meyer, "Welding of Rust-Resistant Steel", Schweisstechnische Mitteilung No. 82 of Oct. 10, 1980 in that the wire electrode used to produce the first build-up weld is over-alloyed as compared to the material of the highly corrosion-resistant cover plate and contains less Fe than that material when the support is made of steel.

With the usual sheet metal thicknesses such as is generally used, for a thickness of 1.5 to 2.5 mm of the cover plate the holes shall have a diameter of 5 to 8 mm.

With unusually thick cover plates, e.g. with thicknesses of more than 2.5 mm it may be advantageous to increase the diameter of the holes to 6 to 10 mm and to cover the second build-up weld by a third build-up weld.

The invention shall be described below through embodiments for the explanation of which the enclosed drawings are used.

Figure 2:
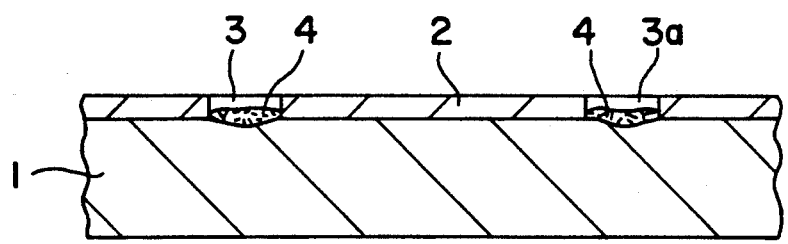
Figure 3:
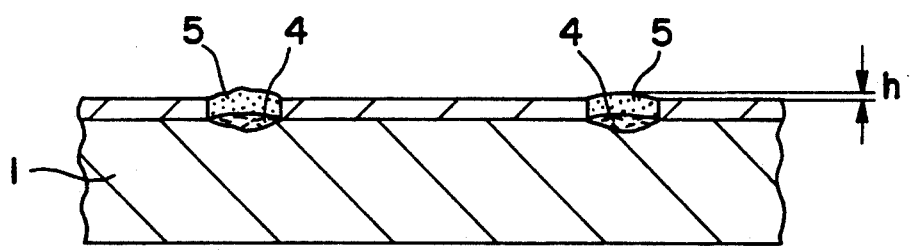
Figure 4:
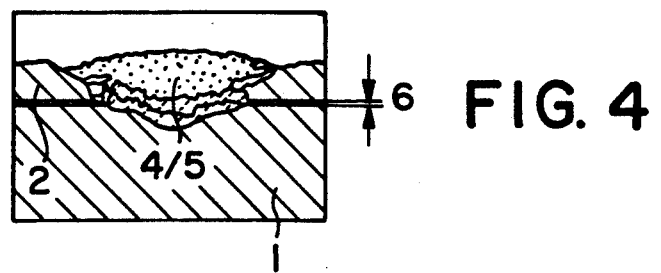

FIGS. 1 to 3 schematically show a section of a cover plate placed on a support,
in FIG. 1 before the first build-up weld,
in FIG. 2 after the first build-up weld,
in FIG. 3 after the second build-up weld.
Furthermore the following figures show:
FIG. 4 the copy of a polished section,
FIG. 5. a section of a cylindrical container,
FIG. 6. section A of FIG. 5,
FIG. 7. section B of FIG. 5,
FIG. 8 Section C of FIG. 5.

In the representation of the schematic process diagram in FIG. 1 through FIG. 3 a cover plate 2 lies flat on a support 1. The cover plate 2 is provided with holes 3, 3a measuring 7 mm in diameter. The cover plate 2, as shown in FIG. 1, has a thickness s of 1.6 mm. The overall thickness D of the covered support is 9.6 mm. In FIG. 2 a first weld layer 4 is applied, in FIG. 3 a second weld layer 5 to cover the first weld layer 4 is provided.

FIG. 3 shows the banking h of the second weld layer 5 measuring for instance 1.5 mm.

The copy of a polished section in FIG. 4 shows a clearance 6 between the support 1 and the cover plate 2 with a clearance with h of approximately 1.5 mm. It can be seen quite clearly how the first weld layer has anchored itself firmly to the support in the center. In this case this first weld layer has a harmless crater in the center which is not only avoided in the covering second weld layer through gradual decrease of the welding current intensity at the end of the second build-up weld, but has been transformed into a slight rise of the central area of the second weld layer.

The material information entered on FIG. 4 indicates that the support consists of ordinary steel R ST 37.2, the cover plate of high-alloyed nickel base alloy of material number 2.4819 under the designation NICROFER 5716 h MoW and was welded with a wire of material number 2.4886. Welding with over-alloyed additive welding material reduces the effect of Fe-absorption caused by the first build-up weld. The build-up welds can be made in general with over-alloyed welding wire similar in kind and category to the material of the cover plate.

FIG. 5 shows a section of a cylindrical container located in the lining, with several holes of the cover plate 2, e.g. the holes 3 and 3c still open, while the holes 3a and 3d have just undergone the first build-up welding with holes 3b and 3e being already covered.

FIGS. 6 to 8 are enlarged sections A, B and C from FIG. 5, now also with the clearance 6 visible.

With a certain degree of skill and an appropriately designed computer program it is possible even in the vertical position (welding position v) shown here to avoid a lump being formed in the second build-up weld under the effect of the gravity of the molten material.

Tested parameters for examples of embodiments in the welding positions h (horizontal) and v are listed below.

The parameters indicated apply to all welding positions.

| Welding data/parameters | 1st + 2nd position |
|---|---|
| Type of current/pole arrangement | = (+) |
| Wire electrodes 0 | 1.0–1.2 mm |
| Inert gas | Argon 99,996 |
| Welding current | 190–210 A |
| Welding voltage | 26–29 V |
| Pulse frequency | approx. 240 Hz |
| Pulse duration | approx. 2 ms |
| Basic duration | approx. 2.1 ms |
| Pulse voltage | approx. 35 V |
| Welding time | approx. 1.25 sec. |
| Wire advance | 6–8 m/min |

Another embodiment of the invention consists in the fact that the metal-inert gas (MIG) welding is carried out in the first layer by means of a spray arc. Deeper burning into the support and accordingly a better welding bond between lining and support is achieved. The second layer is then welded by means of the impulse arc in order to achieve the low degree of iron admixture in the cover layer. Examples of parameters for this are as follows:

| Welding data/parameters | 1st position | 2nd position |
|---|---|---|
| Type of current/pole arrangement | = (+) | = (+) |
| Wire electrodes 0 | 1.0–1.2 mm | 1.0–1.2 mm |
| Inert gas | Argon 99,996 | Argon 99,996 |
| Welding current | 160–180 A | 190–210 A |
| Welding voltage | 22–26 V | 22–29 V |
| Pulse frequency | | approx. 240 Hz |
| Pulse duration | | approx. 2 ms |
| Basic duration | | approx. 2.1 ms |
| Pulse voltage | | approx. 35 V |
| Welding time | approx. 1 sec | approx. 1.25 s |
| Wire advance | 6–8 m/min | 6–8 m/min |

We claim:

1. Process for point welding a thin, highly corrosion-resistant cover plate having a predetermined thickness onto a surface of a thicker, less corrosion-resistant metal support, said cover plate including a plurality of holes which pass through said cover plate, comprising placing said cover plate on top of said metal support, introducing a highly corrosion-resistant additive welding material into said holes, while under an inert gas atmosphere, producing in said holes a first weld layer which is thinner than the thickness of said cover plate and completely covers the exposed surface of said metal support in said holes, allowing said first weld layer to harden while under said inert gas atmosphere, and while said first weld layer is still warm and while still maintaining said inert gas atmosphere, producing in said holes a second weld layer, thereby forming in said holes a buildup weld comprising said first and second weld layers, said cover plate being welded to said metal support along edges of said holes, wherein said inert gas atmosphere is maintained until hardening of said second weld layer is completed, wherein said first and second weld layers are produced by a metal-inert gas (MIG) welding process with wire electrode, and wherein said first weld layer is produced by spray arc welding and said second weld layer is produced by impulse arc welding.

2. The process of claim 1 wherein said welding process is carried out under control of a preprogrammed computer program with manual initiation of production of said first weld layer, and wherein production of said second weld layer is initiated automatically by said computer program after a predetermined time interval.

3. The process of claim 2 wherein production of said second weld layer is terminated automatically by said computer program by decreasing current intensity after a brief after-running period.

4. The process of claim 1 wherein said holes have a diameter in the range of about 5 to 8 mm and the thickness of said cover plate is about 1.5 to 2.4 mm.

5. The process of claim 1 wherein said holes have a diameter of about 6 to 10 mm and the thickness of said cover plate is in excess of 2.5 mm, and wherein said process further comprises producing a third weld layer on top of said second weld layer.

* * * * *